Oct. 4, 1960 G. A. M. PETERSEN 2,954,702
BULL WHEEL STRUCTURE FOR CABLE TENSION STRINGING MECHANISM
Filed June 7, 1956 2 Sheets-Sheet 1
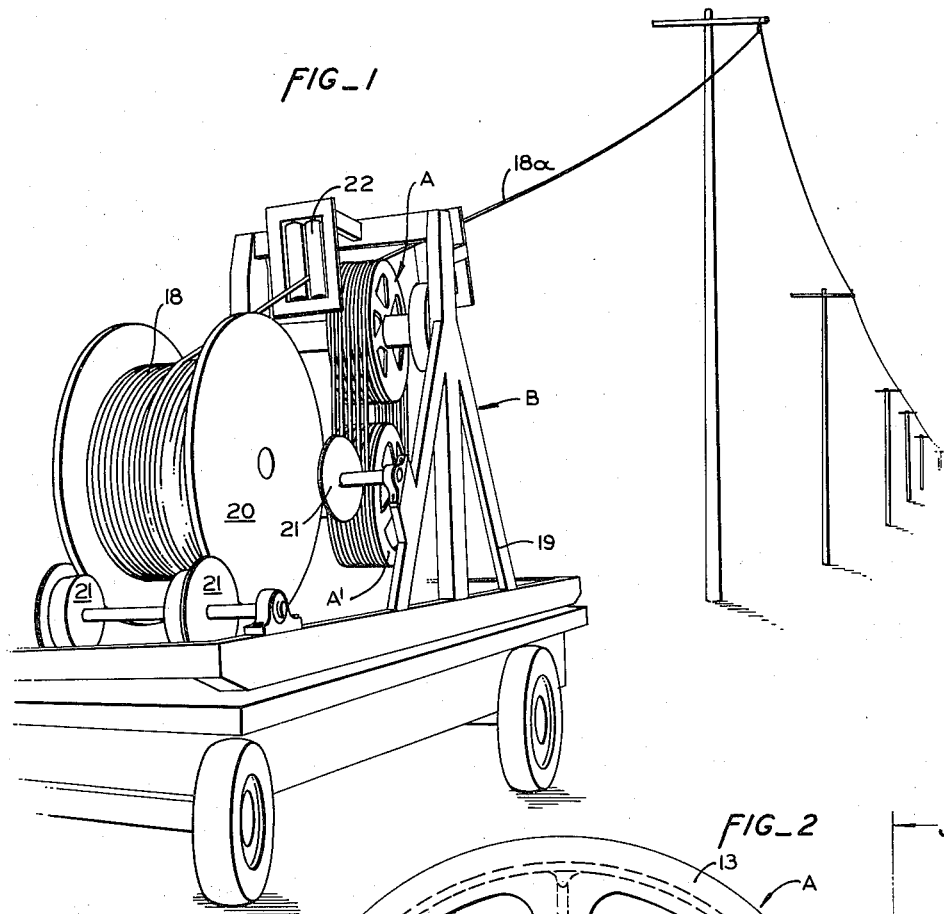
FIG_1
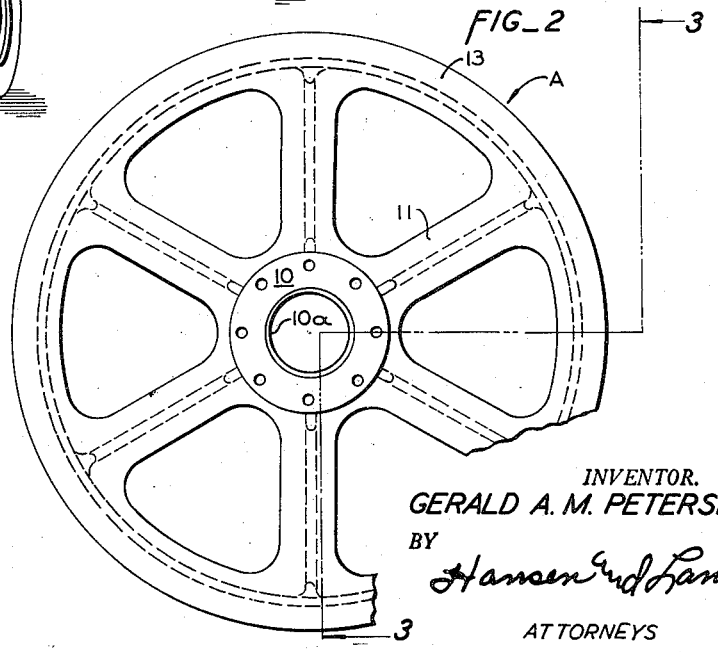
FIG_2
INVENTOR.
GERALD A. M. PETERSEN
BY
*Hansen and Lane*
ATTORNEYS Oct. 4, 1960
G. A. M. PETERSEN
2,954,702
BULL WHEEL STRUCTURE FOR CABLE TENSION STRINGING MECHANISM
Filed June 7, 1956
2 Sheets-Sheet 2
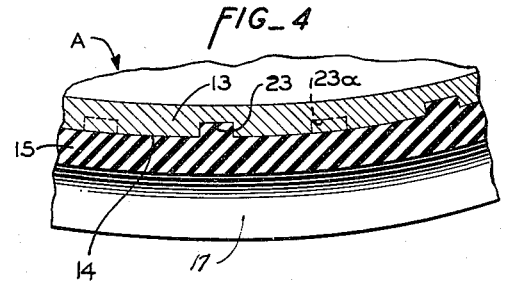
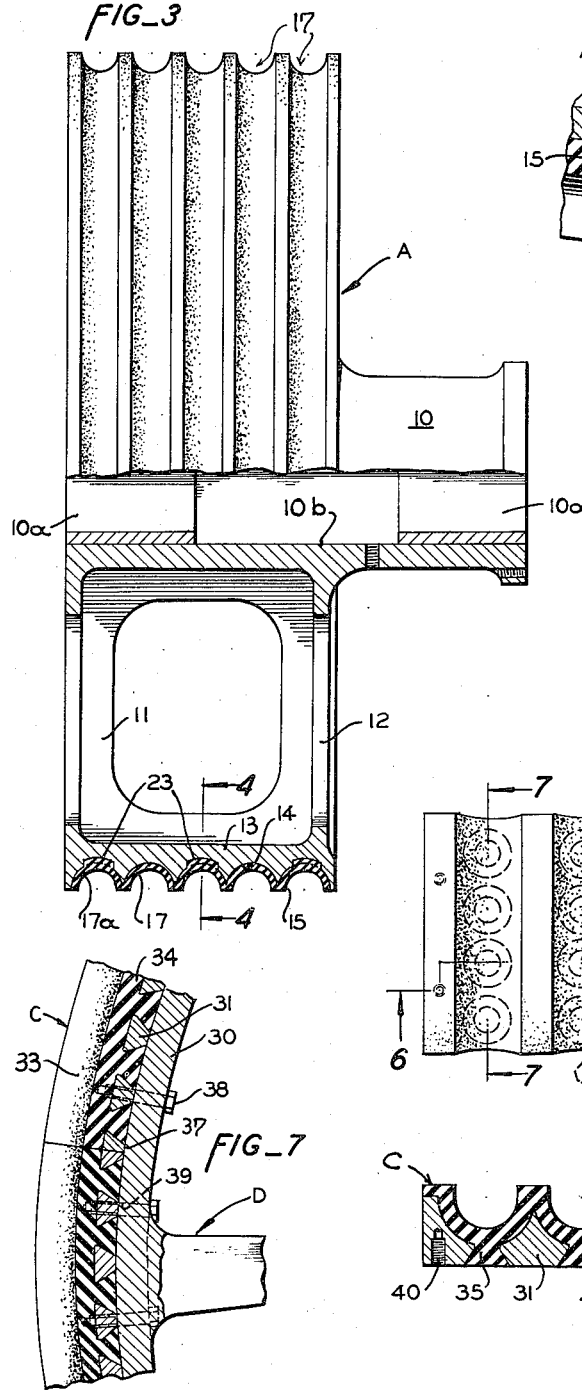
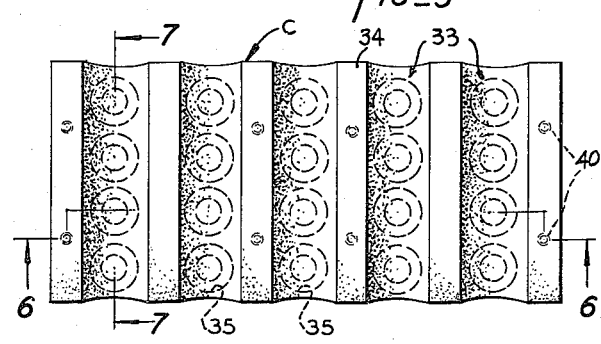
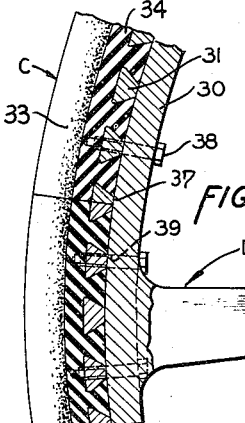
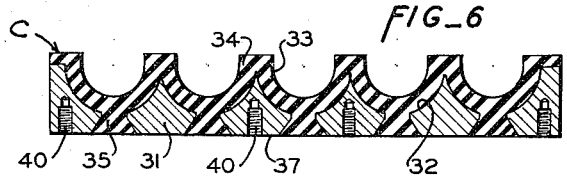
INVENTOR.
GERALD A. M. PETERSEN
BY
Hansen and Lane
ATTORNEYS

2,954,702

BULL WHEEL STRUCTURE FOR CABLE TENSION STRINGING MECHANISM

Gerald A. M. Petersen, 460 Kifer Road, Santa Clara, Calif.

Filed June 7, 1956, Ser. No. 590,070

1 Claim. (Cl. 74—230.7)

The present invention relates to a multi-grooved pulley wheel or sheave, and pertains more particularly to such a sheave for use as a bull wheel of a cable tension stringing mechanism.

Until recently it has been common practice in stringing high tension electrical conductor cable to mount a reel of the cable on a roller cradle support, attach a steel cable to the exposed end of the reel of cable by means of a device called a come-along, and then, by means of a tractor and winch, to draw the transmission cable from the drum and to elevate it to the cross arms of the poles or towers upon which it was to be strung as the cable was advanced along the pole line.

In thus withdrawing the cable from its reel, the cable would sag between poles, and frequently would even touch the ground between poles with possible resultant damage to the cable. These cables for high tension transmission lines are usually made from aluminum, and sometimes are well over an inch in diameter.

The largest sizes of transmission cable usually are mounted on the highest poles or towers, and therefore frequently have to be strung over lower power and electrical lines, as well as across streets, highways, residental areas and other obstructions where the sagging intermediate reaches of the cable would necessarily have to be supported for example by temporary pole structures or nets.

Frequently the cost of handling the intermediate sagging portions of the cable by the old method would run to 9% or more of the total cost of the entire cable stringing operation, including the erecting of the poles or towers.

A large diameter cable used recently in constructing a transmission line from a large western dam was 1.602″ in diameter, and consisted of eighty-four strands of aluminum wire of .1456 diameter each, with a steel core of nineteen strands of steel wire of .0874″ diameter each.

The wire was shipped to the job in 4400 foot reels, and the distance between the poles or towers was 1150 feet. The transmission line was strung in spliced lengths of 22,000 feet, and was drawn out from a tensioning apparatus of the type shown in Fig. 1 by a tractor using 36,000 feet of steel stringing line which was attached to the leading end of the transmission cable. The stringing line was carried out along the pole line by a tractor, which then drew in the steel stringing line by means of a winch, drawing the transmission line along the poles under tension maintained on the cable by the tensioning apparatus.

By maintaining the transmission cable under controlled tension as it was drawn out, the cable did not touch the ground between poles, and no final tensioning of the cable to take out slack between poles or towers was required. Furthermore, the necessity for support for between-pole sagging portions of the cable in passing over intermediate obstructions also was largely eliminated.

When using metal bull wheels in accordance with prior practice, and particularly aluminum wheels, the same metal as the cable, there is damage of galling the cable. Also, in the event that sand or gravel should find its way between the cable and the bull wheel, there is danger of nicking the cable. Since any such galling or nicking of the cable would cause corona loss, with resultant interference to radio reception, prevention thereof is an important factor in cable stringing operations.

The present invention contemplates the provision of a bull wheel for a cable tensioning mechanism, said bull wheel having a resilient, non-abrasive, wear-resisting and non-slipping facing firmly and permanently bonded thereto.

The invention also provides a multi-grooved, non-abrasive resilient facing for the correspondingly multi-grooved periphery of a metal bull wheel for cable tensioner, the resilient facing being of substantially uniform thickness and secured to the bull wheel with the grooves in the facing substantially concentric in cross sectional curvature to the grooves in the rim, thereby providing a protective facing in the grooves of which a cable may be seated for controlled tensioning during a cable stringing operation.

These and other objects of the invention will be apparent from the following description and the accompanying drawings wherein Fig. 1 is a perspective view of a cable tensioning mechanism embodying the present invention as it appears when set up for use in stringing a high tension electrical conductor cable along a pole line.

Fig. 2 is an enlarged end elevational view of one of the bull wheels shown in the mechanism of Fig. 1, a portion thereof being broken away.

Fig. 3 is a further enlarged view, partly in side elevation and partly in section, taken along line 3—3 of Fig. 2.

Fig. 4 is a further enlarged fragmentary sectional view taken along line 4—4 of Fig. 3.

Fig. 5 is an enlarged plan view of a segmental facing member of a modified form of the invention.

Fig. 6 is a sectional view taken along line 6—6 of Fig. 5.

Fig. 7 is a fragmentary sectional view taken as along line 7—7 of Fig. 5 showing the segment of Fig. 5 attached to the rim of a supporting wheel member.

Briefly, in the embodiment of the invention shown in Figs. 1–4, a metal bull wheel A has a usual hub 10, two sets of axially spaced spokes 11 and 12, and a rim 13. A plurality of similar annular grooves 14 are formed in parallel, symmetrically spaced relation in the periphery of the rim 13. These grooves are of substantially semi-circular cross sectional configuration of larger radius than a cable to be handled by the bull wheel, and are faced with a layer 15 of resilient, wear resistant material having a high co-efficient of friction. The facing 15 is bonded to the rim 13, and has a plurality of annular grooves 17 formed therein concentric in cross sectional configuration, with the grooves 14 in the metal rim 13. The grooves 17 in the facing 15 are of a size to permit the seating therein of a transmission cable 18 (Fig. 1) of predetermined diameter.

Referring to the drawings in greater detail, in the cable tension stringing apparatus B (Fig. 1) a pair of bull wheels A and A' are rotatably mounted in axially parallel relation on a frame 19, and are controlled by suitable braking mechanism, not shown, so as to control the tension on the outgoing run 18a of the cable as it is withdrawn from a cable reel 20 mounted on brake controlled rollers 21 on the frame 19. The cable 18 passes from its reel 20 through a fair lead 22 over the left hand groove 17a in the upper bull wheel A.

The cable 18 then is wrapped in generally flattened helical form around successive grooves in the upper and lower bull wheels A and A'. The grooves 17 of one bull wheel preferably are offset axially of the wheel by half their width relative to the grooves 17' in the other bull wheel, so that a cable 18 wound about both wheels as shown in Fig. 1 will lead as smoothly as possible from the grooves of one bull wheel to those of the other.

The bull wheel A (Figs. 1, 2, 3 and 4) preferably is of cast aluminum, with spokes 11 and 12 radiating from the hub 10, and cylindrical rim 13. Bearing bushings 10a of suitable bearing metal are inserted in the ends of the bore 10b of the hub 10.

The parallel annular grooves 14 formed in the peripheral face of the rim 13 are larger in radius than the cable 18 which the bull wheel is designed to handle by an amount equal to approximately the thickness of the resilient facing 15 to be applied to the rim 13.

For more securely anchoring the resilient facing material 15 against slippage, a plurality of anchor recesses 23 are formed in symmetrically spaced relation around the bottom of each of the grooves 14 in the metal wheel rim 13, the recesses 23 and 23a in alternate grooves (Fig. 4) being offset circumferentially of the rim by an amount equal, preferably, to one-half the distance between adjacent recesses 23 in the same groove.

The resilient facing material 15 is bonded to the metal of the rim 13 in a well known manner, and the groove 17, of a radius to receive a cable 18 of predetermined diameter in seated relation therein, are molded in the periphery of the facing material 15 so that each groove 17 in the facing 15 is substantially concentric in cross sectional curvature with its corresponding groove 14 in the rim 13 therebeneath.

A suitable material for the resilient facing material 15 is neoprene, but rubber of the type used in automobile tire treads or other rubber-like material or plastic having suitable characteristics may be employed instead.

In the form of the invention shown in Figs. 2 and 3 the resilient facing 15 is applied as a homogeneous unit throughout the entire circumference of the bull wheel. However, in extremely large wheels, this is sometimes difficult to accomplish. For such large wheels the facing may be applied in metal backed segments C to a smooth rimmed wheel D, a portion of the rim 30 of which is shown in Fig. 7.

Each segment C has a cylindrically curved segmental metal base portion 31 curved internally to fit on the periphery of the wheel rim 30.

Grooves 32 similar to the grooves 14 of Figs. 3 and 4 are provided longitudinally of each segment C for respective alignment with corresponding grooves of other similar segments C when the segments are applied in end-to-end abutting relation as shown in Fig. 7 to enclose the periphery of the wheel rim 30.

As explained for the bull wheel A of Figs. 1-4, each groove 32 is preferably of circular cross sectional configuration and of larger radius than the cable receiving grooves 33 in a facing 34 of resilient material applied to each metal base segment 31, with the grooves 33 in the facing 34 concentric in cross sectional configuration with the grooves 32 in the metal base segment.

A plurality of tapered holes or keying recesses 35 are drilled from the inner face 37 of each metal base segment 31 opening into the bottoms of the grooves 32 in the metal base segment. The resilient facing material 34 is applied in a plastic condition, and is forced into these tapered holes to assist in anchoring the facing material against relative displacement or creep with respect to the metal base segment to which it is applied.

The segments C with their resilient facings 34 bonded thereto as shown in Figs. 5 and 6 then are secured to the periphery of the rim 30 by screws 38 (Fig. 7) which are inserted through holes 39 provided therefore in the rim 30 and are screwed into threaded holes 40 in the base segments 31.

Since the operation of cable tensioners of the type illustrated in Fig. 1 is well known to those familiar with the art, and since the operation thereof is not changed by the provision of the improved bull wheel of the present invention, it will be unnecessary to describe the operation of the present invention in detail.

The invention provides a greatly improved bull wheel for use on cable tensioning mechanism of the type illustrated in Fig. 1, particularly on the larger diameters of cable, since it has great holding power due to its high frictional engagement with the cable, and avoids damaging the cable since it provides a resilient cushioned seat for the cable as is passes around the bull wheel.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

A pulley structure for a heavy duty bull wheel for a cable tensioning mechanism wherein a plurality of turns of a cable are wrapped helically, and under substantial tension, around a pair of said bull wheels; said pulley structure being adapted to be applied to a pulley having a hub, a rim supported on said hub and having a substantially cylindrical outer face co-axial with the hub; said structure comprising a facing removably applied to such cylindrical rim face, said facing comprising a plurality of identical, complementary segments, each segment extending the full, effective width of such rim, and throughout a peripheral portion of such rim not exceeding 180 degrees, each segment comprising a strong, rigid, arcuate inner base adapted to fit snugly onto the cylindrical outer face of such rim, the outer face of each segment being grooved with a plurality of arcuate, cable guide grooves which are parallel to each other and perpendicular to the axis of such pulley rim when said segments are applied thereon, the grooves in each base segment being circumferentially co-extensive with the grooves in adjacent segments, a plurality of anchoring screws adapted to penetrate the rim of such pulley from its inner side and to be screwed into threaded holes provided therefor in each rigid overlying base segment to anchor the latter securely onto such rim, a plurality of keying recesses in the grooved outer face of each base segment, and a coating of tough, resilient, facing material applied to the grooved outer face of each base segment and extending in interfitting relation into said keying recesses, said coating being grooved with grooves which are concentric in cross sectional configuration with the underlying grooves in the rigid base segments for receiving helically wound, tensioned cables therein, whereby said segments with their applied coatings are quickly replaceable by the removal and replacing of said screws.

References Cited in the file of this patent

UNITED STATES PATENTS

| | | |
|---|---|---|
| 146,615 | Sanford | Jan. 20, 1874 |
| 1,102,154 | Kearns | June 30, 1914 |
| 1,576,924 | Malloy | Mar. 16, 1926 |
| 1,632,512 | Serva | June 14, 1927 |
| 1,636,492 | Taylor | July 19, 1927 |
| 1,792,733 | De Wein | Feb. 17, 1931 |
| 2,017,149 | Greening | Oct. 15, 1935 |
| 2,161,270 | Anderson | June 6, 1939 |
| 2,204,938 | LeBus | June 18, 1940 |